United States Patent [19]

Shahani

[11] 4,412,849

[45] Nov. 1, 1983

[54] METHOD AND APPARATUS FOR CONTROL OF GAS-BORNE PARTICULATES

[75] Inventor: Chandru M. Shahani, Bombay, India

[73] Assignee: Klenzaids Engineers Private Limited, Bombay, India

[21] Appl. No.: 323,571

[22] Filed: Nov. 20, 1981

[30] Foreign Application Priority Data

Apr. 9, 1981 [GB] United Kingdom ................ 8111175
Apr. 29, 1981 [GB] United Kingdom ................ 8113173

[51] Int. Cl.³ .............................................. B01D 46/00
[52] U.S. Cl. ..................................... 55/97; 55/385 A; 55/473; 55/500; 55/521; 55/DIG. 29; 55/DIG. 18; 98/115 LH; 98/33 A; 98/40 D
[58] Field of Search ................ 55/DIG. 29, 500, 521, 55/DIG. 18, 385 A, 473, 97; 98/115 LH, 33 A, 36, 40 D

[56] References Cited

U.S. PATENT DOCUMENTS

| 3,158,457 | 11/1964 | Whitfield | 55/473 |
| 3,251,177 | 5/1966 | Baker | 55/385 A |
| 3,336,855 | 8/1967 | Messina | 55/DIG. 29 |
| 3,776,121 | 12/1973 | Truhan | 55/DIG. 29 |
| 3,895,570 | 7/1975 | Eagleson | . |
| 4,009,647 | 3/1977 | Howorth | 55/DIG. 29 |

FOREIGN PATENT DOCUMENTS

| 1477570 | 6/1977 | United Kingdom . |
| 1488513 | 10/1977 | United Kingdom . |
| 1555563 | 11/1977 | United Kingdom . |
| 1527116 | 10/1978 | United Kingdom . |
| 1538862 | 1/1979 | United Kingdom . |

OTHER PUBLICATIONS

Environmental & Contamination Control by R. N. Haig, British Kinematography Sound & Television, 4/71, pp. 122-131.

Primary Examiner—Bernard Nozick
Attorney, Agent, or Firm—Watson, Cole, Grindle & Watson

[57] ABSTRACT

A method and apparatus (1) for control of airborne particulates in enclosed spaces, wherein air is made to flow in parallel airstreams (F), with velocities of the streams selectively graded across the work space (W), so that the integrity of the air flow pattern is better preserved while encountering obstructing objects (6) that lie in its path; and so that any particle introduced into a stream remains entrained and airborne over a longer distance along the clean-to-dirty axis (X). The velocity gradient is achieved by a filtering device (1) comprising a plurality of pleats (25) each pleat having a different surface area.

5 Claims, 20 Drawing Figures

$$\frac{P_A}{\rho g} + \frac{U_A^2 \rho}{\rho g} = \frac{P_B}{\rho g}$$

WHERE, $P_A$ = STATIC PRESSURE AT 'A'

$P_B$ = STATIC PRESSURE AT B $\rho$ = AIR DENSITY $g$ = GRAVITATIONAL CONSTANT $U_A$ = VELOCITY AT 'A'

DETAIL 'A' PER FIG. 18.

METHOD AND APPARATUS FOR CONTROL OF GAS-BORNE PARTICULATES

BACKGROUND OF THE INVENTION

The present invention relates to a method of controlling gas-borne particulates, and more particularly, but not exclusively, to controlling the migration and deposition of contaminating airborne particulates. It further relates to apparatus for achieving such control which may be used, for example, to obtain a work space substantially devoid of airborne particulate contaminants, both biological and non-biological, such as is necessary for the manufacture of sterile pharmaceutical products and micro-electronic components. Another use is in hospitals, where isolation of patients and prevention of contamination during surgical procedures is intended.

Previously proposed airborne contamination control methods include the widely used Laminar Air Flow System for equipment like work stations and sterilizing tunnels, and also for clean or sterile rooms. These rely on airflow in which the entire body of air within a confined area essentially moves with uniform velocity along parallel flow lines. This velocity through the cross section of the work space, is normally maintained at 27.5 meters per minute with a uniformity within plus or minus 20%. When the airflow is vertically downward this velocity can be lower, but with the uniformity maintained. The intention is to stratify the air such that minimum cross-stream particulate migration occurs, with the result that activity-generated particulates that become airborne are carried linearly along a predictable path.

These previously proposed methods are deficient in that when an object, for example, the workpiece or manufacturing equipment or operator, whose presence is unavoidable in practical work situations, is introduced into the airstream, the laminar air flow is altered such that it is not possible to regulate the particulate content within the work space as would be possible without the object altering the air flow pattern.

It is known that when an object is introduced into moving streams of air, a higher pressure exists on the upstream side than on the downstream side of the object. The pressure gradient around the object creates turbulence, which in turn leads to eddy currents around the object, with the consequent back-mix effects, which entrap in the proximity of an obstructing object particles shed by the object into the air mass around the object. This reduces the cleanliness levels otherwise obtainable.

Most articles found in a work station are, in fact, resting on one or other flat, horizontal surfaces. For example, operators and equipment stand on floors, work-pieces on tables, and articles to be sterilized travel on horizontal conveyor belts. See U.S. Pat. Nos. 3,977,091 and 4,140,479. In a horizontal flow configuration, the path of a flow of gas across these articles is thereby blocked at the lower extremities of the obstruction. Air streams must either go around or over the blockade which, in uniform velocity flow, they do at accelerated velocities. Manual movements in relation to a workpiece, which usually generate contaminants, tend to be in the vertical plane. This stems from the operator's need to maintain an ergonomic focal distance between his eyes and the work activity. These vertical movements add to the effects of the low pressure zone in the wake region which also alters the flow axis of the streamlines in the separated boundary above the object so that the direction of flow is downward, thereby orienting entrained particles into deposition trajectories.

The hitherto proposed uniform velocity laminar air flow systems are also liable to be affected by particulate migration caused by different energy gradient forces. Free particulates travel to the region where the energy level is lowest. For example, particulates settle under the influence of gravity; and, where a thermal gradient exists, particulates tend to move towards the cooler zone; and statically charged particulates move towards a neutralising field. In practical work situations, a single uniform velocity does not effectively counter all these energy differentials.

To circumvent these deficiences of uniform velocity air flow systems, many methods have been proposed. These include the use of air-directing devices that cause an air flow to converge, or to focus, onto the obstructing work objects such that purging of the low pressure zone with filtered air is achieved. As these air streams intersect, the inherent advantages of predictability that parallel streamlines, not disturbed by the obstruction, have in removing particulate contaminants is compromised. See U.S. Pat. No. 3,426,512.

Likewise, for hospital operating rooms, it has been proposed to utilize air-directing vanes which deflect at acute angles the air emanating from the filter face towards the site of the surgical activity. The air flow, on encountering the downstream wall, is retro-directed along return paths separated by a zero velocity boundary, thus obviating the use of partitions. See U.S. Pat. No. 3,721,067. Another method, suggested for work benches, is to short-cycle the air flow and entrained particulates, downstream of the obstruction, through apertures located on the edges of the containment surfaces including the work table. See U.S. Pat. No. 3,378,076.

It is an object of this invention to provide a method for filtering and conveying air unidirectionally in parallel streamlines, each of which moves at a different velocity selectively predetermined and graded across the cross-section of the air path, such that air-borne particulates, which migrate due to aerodynamic drag and other kinetic forces and/or potentiated by thermal or electrostatic energy differentials, are regulated more efficaciously.

It is another object of this invention to provide a device having instrumentalities for generating predetermined air streams that are parallel; where each stream moves at a rate of flow which is different and graded such that particulate migration can be better controlled.

It is a further object of this invention to increase the number of air-borne particulates that will stay in linear orientations further along a clean to dirty axis, when such particulates are released into a forward or reverse multiple velocity gradient cross-flow clean or sterile room, or clean air work station.

It is another object of this invention to decrease the particulate contamination during sterilization and depyrogenation of objects, for example, glass containers for sterile pharmaceutical products by previously heated air, while at the same time to provide an air flow oriented to transfer heat at thermodynamically designed gradients.

SUMMARY OF THE INVENTION

In keeping with these objectives and with others which will become apparent hereafter, one feature of the invention resides in providing a laminar flow of gas wherein the flow velocity of adjacent streamlines of gas within the flow varies in at least one direction transverse to the flow. Another resides in a final filter which has a tapering formation and comprises a plurality of pleats, with each successive pleat run being progressively and incrementally greater, and thereby with a larger surface area; which, with a constant media traverse air velocity, gives rise to a graded pressure differential at the projected face; thus yielding a correspondingly graded exit air velocity profile.

The invention itself, however, both as to the construction and method of operation of embodiments thereof, together with additional objects and advantages thereof, will be better understood from the following description of specific embodiments when read in connection with the accompanying drawings presented by way of illustration but not limitation.

DETAILED DESCRIPTION

In each of the embodiments now to be described, a blower-pressurized housing in a source of air, incident on, and traversing without bypassing, the filtering device; which device, in addition to performing its function as a filter, delivers air in parallel airstreams which are at velocities that are graded progressively at predetermined rates. The width of the airstream arrows F is, in all Figures, in proportion to the velocity of the airstream associated with that arrow.

Figures 1, 2, 3, 4:
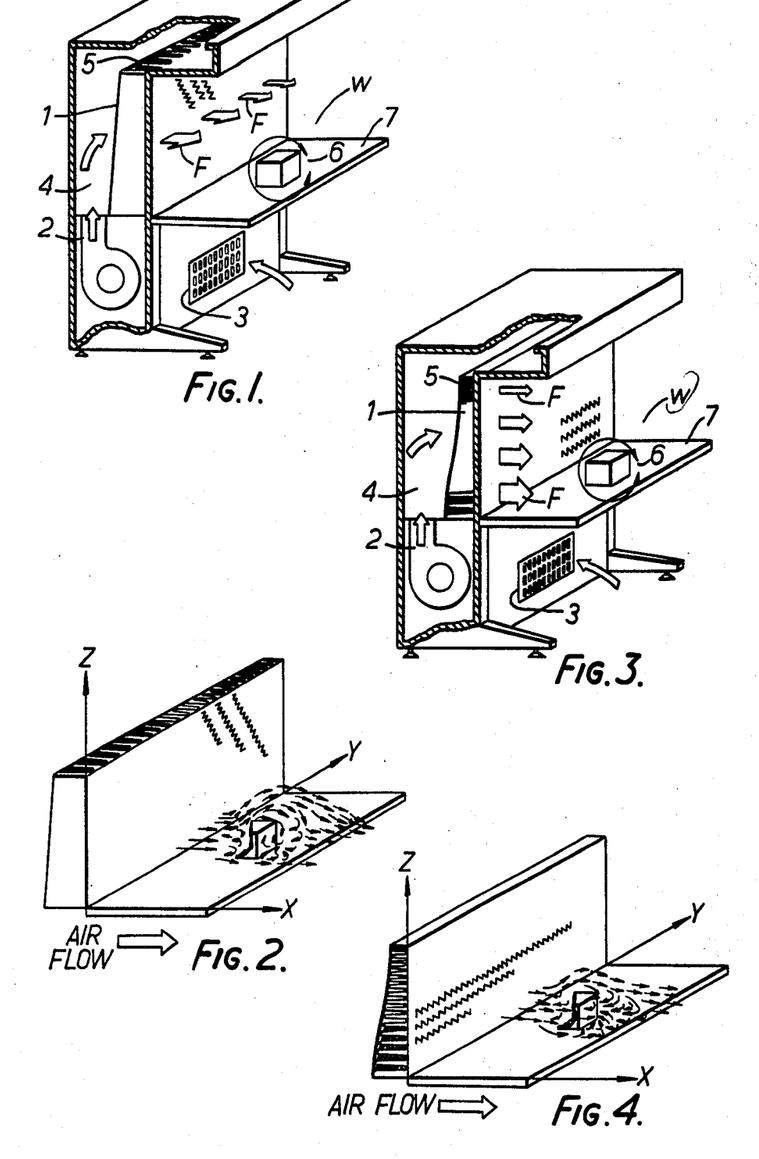
FIG. 1 is a perspective view, partially cross-sectioned, which shows the basic elements in position, of one embodiment according to the present invention arranged in a horizontal air flow configuration where the velocity gradient is along both the horizontal and vertical axes.
FIG. 2 is a fragmentary schematic view illustrating the different axes of operation in relation to the filtering device and a bluff object obstructing the air flow graded as per FIG. 1.
FIG. 3 is similar to FIG. 1, wherein the filtering device is positioned to convey air flow in velocities graded along the vertical axis.
FIG. 4 corresponds to FIG. 2, with the air flow graded along the vertical axis.

FIG. 1 schematically illustrates one embodiment of the invention which comprises a work space W having a particulate density of less than three particles of 0.5 micron per liter of air, this being achieved by a device comprising a filter 1 that filters and in addition conveys air in streamlines F of graded velocities from 20 meters per minute to 40 meters per minute; a blower 2 having an air intake through a coarse filter 3 and delivering air to a plenum 4 under sufficient pressure to get a single uniform traverse velocity of 2 to 3 meters per minute across the medium 5 from which the filter pleats are formed. As the projected exit face of the filtering device 1, the rate of flow is determined by the area of each pleat which successively and progressively increases from one pleat to the next along the 'Y' and 'Z' axes. This is depicted by FIG. 2, which also shows axis 'X' as the direction of air flow which is perpendicular to the plane represented by 'Y' and 'Z' axes. 'U' is the magnitude of the velocity of air flow. A bluff object 6, resting on a table surface 7, obstructs the air flow and gives rise to a wake or low pressure zone where turbulence is anisotropic. The streamlines that pass over the object accelerate and rise very sharply.

Referring again to FIG. 2, in a uniform velocity air flow, as there is no variation in velocity along either the 'Y' or 'Z' axis, $$(dU/dY)=(dU/dZ)=0.$$

Where the magnitude of the velocity of each streamline is different along the 'Y' axis or 'Z' axis or both axes, then $$(dU/dY)=a \text{ and } (dU/dZ)=b$$

where a and b can assume any value, or a succession of values, between minus infinity and plus infinity, provided a and b are not both zero.

As the air flow is in non-intersecting streamlines, it lies within the laminar regime. This is Potential Flow along the 'X' axis. In addition to potential flow, there exists a gradient in the magnitude of the velocity vector along the 'Y' or 'Z' axes, or both, giving rise to a proportional shear-stress field along the 'Y' or 'Z' axes, or both, respectively. Thus, the gradient velocity air flow is, in reality, a superimposition of a traverse shear-stress field on a potential flow along the 'X' axis.

FIG. 3 shows a configuration similar to the one shown in FIG. 1, wherein the filtering device 1 is constructed and positioned such that the velocity gradient is along the 'Z' axis and increases in magnitude as it nears the table surface 7.

In FIG. 4, the obstructing object 6 within the air flow causes an isotropic turbulence in the wake zone, but the streamlines over the object do not accelerate and rise as sharply as in FIG. 2.

Figures 5, 6, 7:
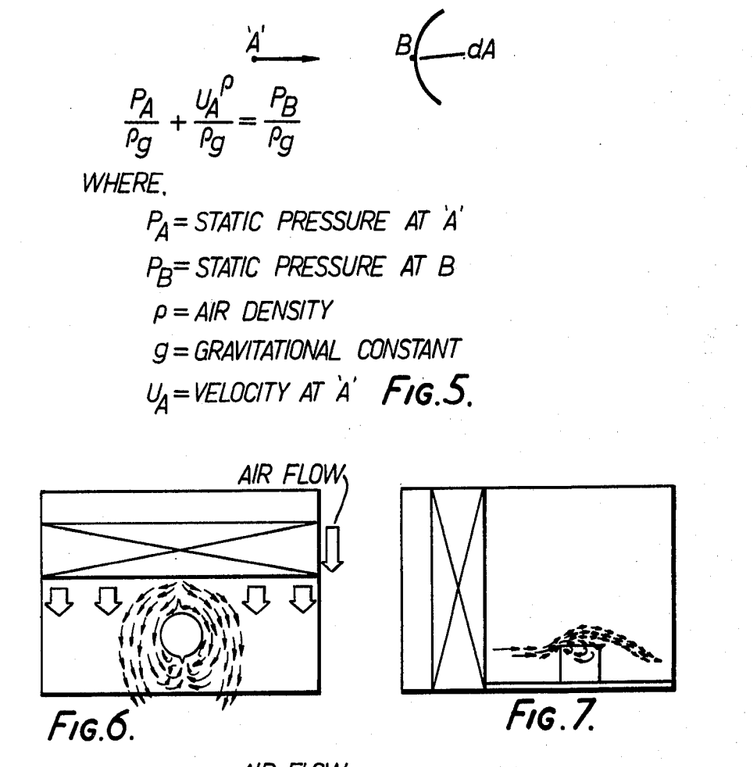
FIG. 5 represents Bernoulli's principle.
FIG. 6 is a fragmentary schematic plan view of a beaker placed in the path of a uniform velocity air flow.
FIG. 7 is a fragmentary schematic view in elevation, with the beaker in uniform velocity air flow.

FIG. 5 depicts the principle of conservation of energy, as quantified by Bernoulli's equation. 'A' represents any point upstream of the object where flow is steady, fully developed and time invariant. 'B' is the point of impaction on surface dA. When the angle of incidence =0, the entire kinetic head of a streamline converts to an equivalent pressure head and 'B' is a point of stagnation. Likewise, a bundle of similarly impacting streams on a flat surface yield a corresponding bundle of stagnation points.

A uniform velocity air flow, in such a situation, would give rise to such a bundle of stagnation points, each of which is endowed with the same pressure head, thereby rendering the plane of impaction an equipotential plane. In a graded velocity air flow, each stream would impact with a different kinetic head, which reduces along a pre-determined axis, convert to an equivalent pressure head which also reduces correspondingly, thereby inducing the air to flow along a predisposed direction.

With such bluff objects as are shown in FIGS. 2 and 4, resting on flat surfaces that prevent air flow beneath the object, the low pressure zone is characterized by large frictional losses caused by eddies and vortices which are kept in motion by the shear-stress between this wake zone and the separated current.

FIG. 6 shows a beaker obstructing air flowing with uniform velocity. A low pressure zone covering substantially the entire rear portion is formed. Lateral boundary layer separation occurs just behind the upstream face causing streamlines to assume essentially synclastic paths. However, as shown in FIG. 7, those going over the upper edge accelerate in velocity, particularly as there is no pathway beneath the object. Once over the leaving edge, descent is visibly sharp.

Figure 8:
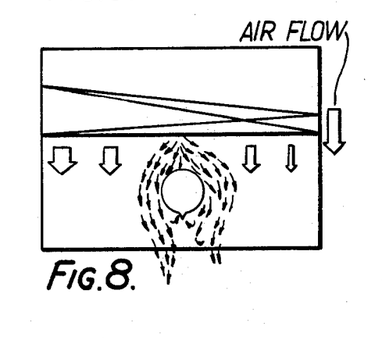
FIG. 8 is a view corresponding to FIG. 6, with the same beaker placed in air flow graded along the horizontal axis.

In gradient flow the streamlines, as shown in FIG. 8, divide asymmetrically both over and around the object. The wake zone is both narrower and skewed and the turbulence anisotropic. The streamlines asymptotically approach an axis which is parallel to the direction of air flow, but offset from the centre of the beaker towards the higher velocity air stream.

Figure 9:
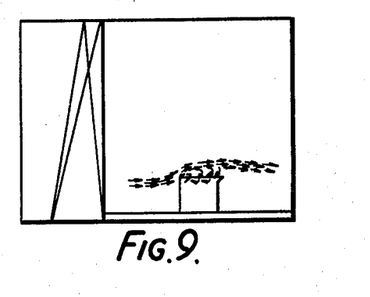
FIG. 9 corresponds to FIG. 7, with the air flow velocities graded along the vertical axis and increasing in the direction of the working table.

In FIG. 9, streamlines going over the object do not descend sharply but instead flatten out and assume steady state flow parallel to the work surface.

Figures 10, 11, 12, 13:
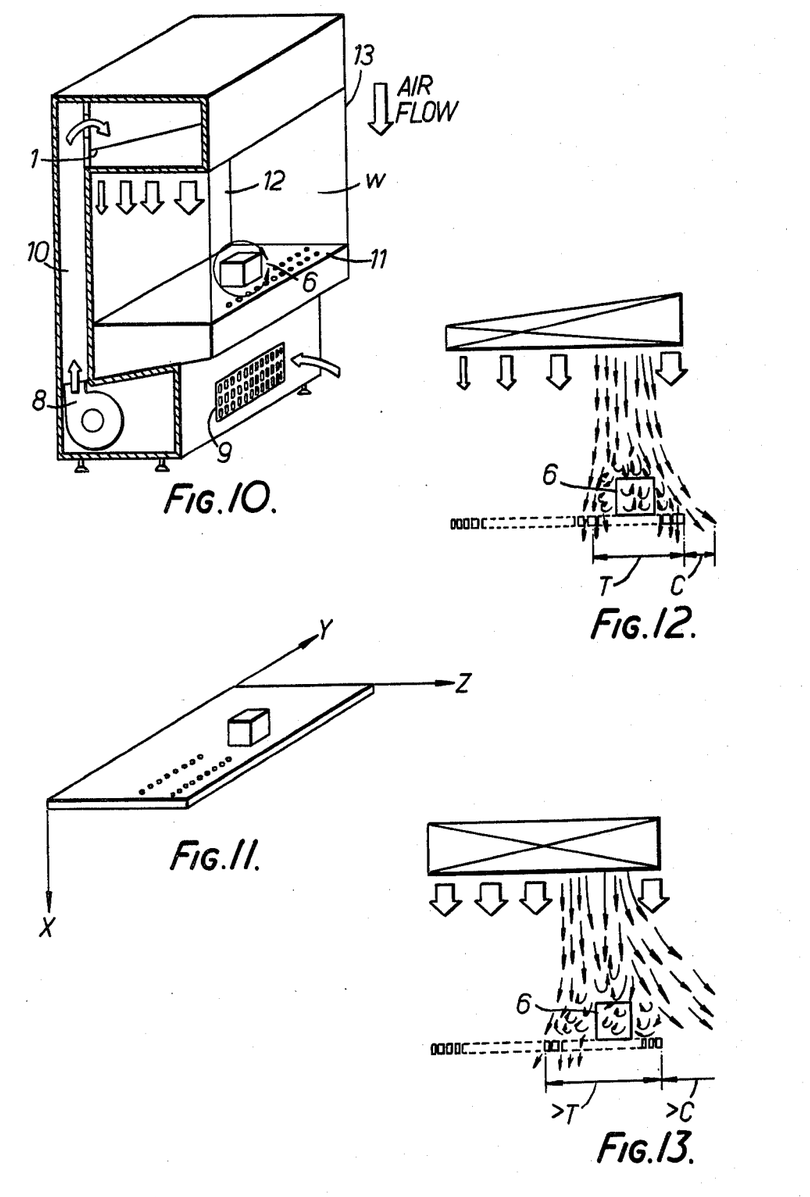
FIG. 10 is a perspective view similar to FIG. 1, of another embodiment where the air flow is in a vertical direction, with the velocity gradient along the horizontal axis.
FIG. 11 is a fragmentary schematic view showing the different axes of operation in relation to a filtering device and a bluff object in the path of graded velocity air stream flowing vertically down.
FIG. 12 is a fragmentary schematic view in elevation of the streamlines around a bluff object in a graded air flow directed vertically.
FIG. 13 corresponds to FIG. 12, but in a uniform velocity air flow.

FIG. 10 shows a vertical configuration, comprising a blower 8, intake filter 9, plenum 10 and a final filtering device 1, the work space being bounded by containment surfaces such as a perforated table 11, back panel 12 and side panels 13, with access to a work space W. In this configuration the velocities are graded to increase in magnitude towards the front of the workspace with the object of retaining air stream linearity across the open working access.

FIG. 11 shows the axes of operation in relation to FIG. 10.

FIG. 12 shows the air flow streamlines that would affect particulate trajectories. The presence of an object 6 gives rise to a turbulent zone T and a non-linear velocity zone C. For a single velocity air stream per FIG. 13, the corresponding turbulent zone by object 6 is of greater extent than T and the non-linear velocity zone greater than C.

Figure 14:
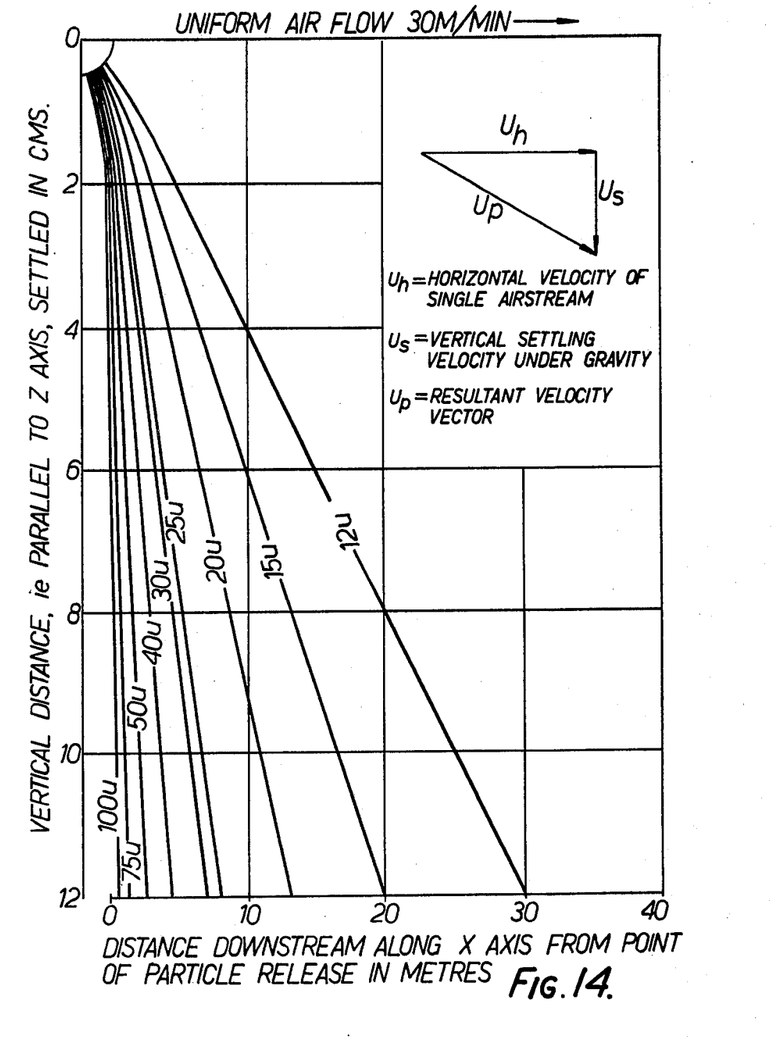
FIG. 14 shows the trajectories followed by particles of various sizes when released in a uniform velocity air flow.
Figure 15:
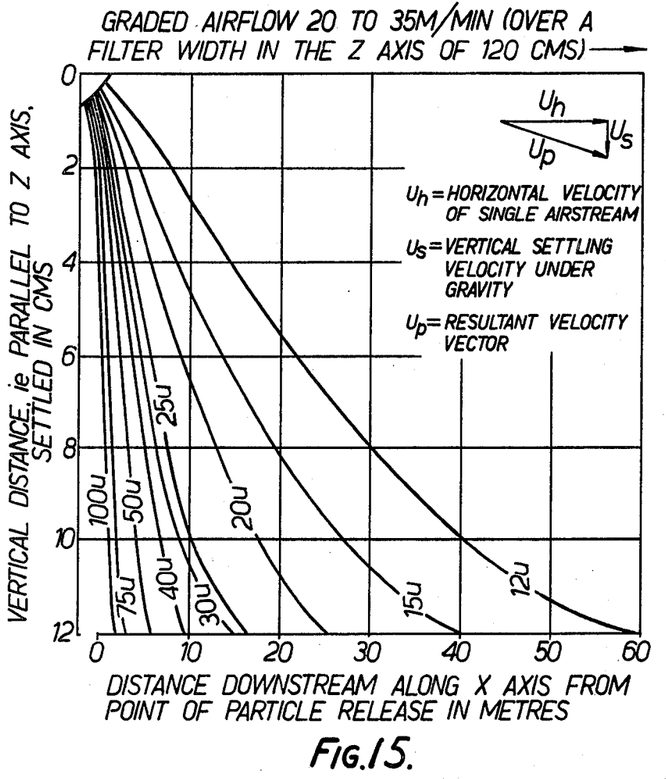
FIG. 15 corresponds to FIG. 14, with the same particles in a graded velocity air flow.

The utility of multiple velocity air streams is highlighted by FIGS. 14 and 15 which plot typical curves for different trajectories followed by spherical particulates having a specific gravity of 2.0. Particulate contaminants when introduced into air streams trace a parabolic trajectory until they attain their terminal velocity thereafter, where all streamlines are of equal and constant velocity, they exhibit a more or less straight line of descent.

Where the air streams are graded as per FIG. 15 along the vertical axis, this locus concaves upwards owing to the progressively increasing velocities encountered along the path of descent under gravity. The increase in velocity U with downward movement along the vertical axis in this way counteracts the adverse effects of an energy differential transverse to the X-axis to which the particulates are subject.

Figure 16:
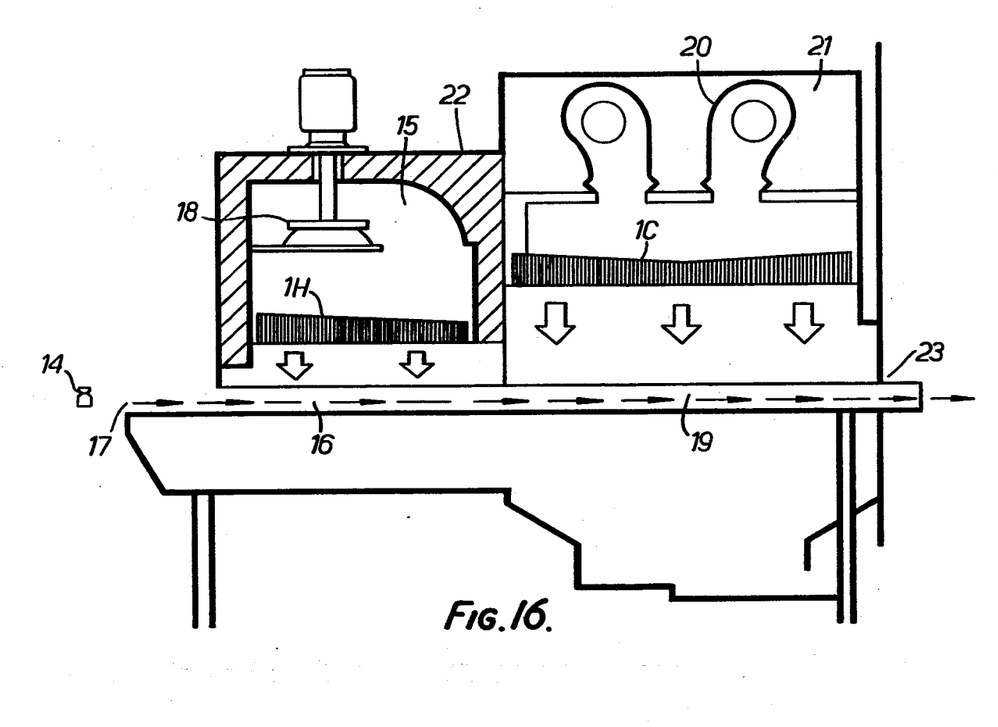
FIG. 16 is a cross-section in side-elevation of one form of apparatus for sterilizing objects.

FIG. 16 illustrates another embodiment of the invention, being an arrangement to continuously sterilize and depyrogenate glass containers 14 for sterile pharmaceutical formulations, by means of pre-heated air passing through a filtering device 1H located in a housing 15 of a sterilizing zone 16.

Containers 14 are transported in a conveyor 17 under graded air flow achieved by means of the filtering device 1H and a blower 18. They are heated to temperatures above 300° C. The containers 14 are further transported on the same conveyor 17 to a cooling zone 19. In this zone they are cooled by graded air streams from filtering device 1C and blowers 20, located in a housing 21, which is segregated from the sterilizing zone housing 22. The hot air stream gradient is so oriented that the highest velocity impacts on the coolest containers. At the start of the cooling cycle, the hottest containers receive higher velocity, but at the end of the cooling cycle, consistent with FIG. 16, a higher velocity is oriented to ensure better control of airborne particulates, as the containers at this stage 23, are vulnerable to microbial contamination.

Figure 17:
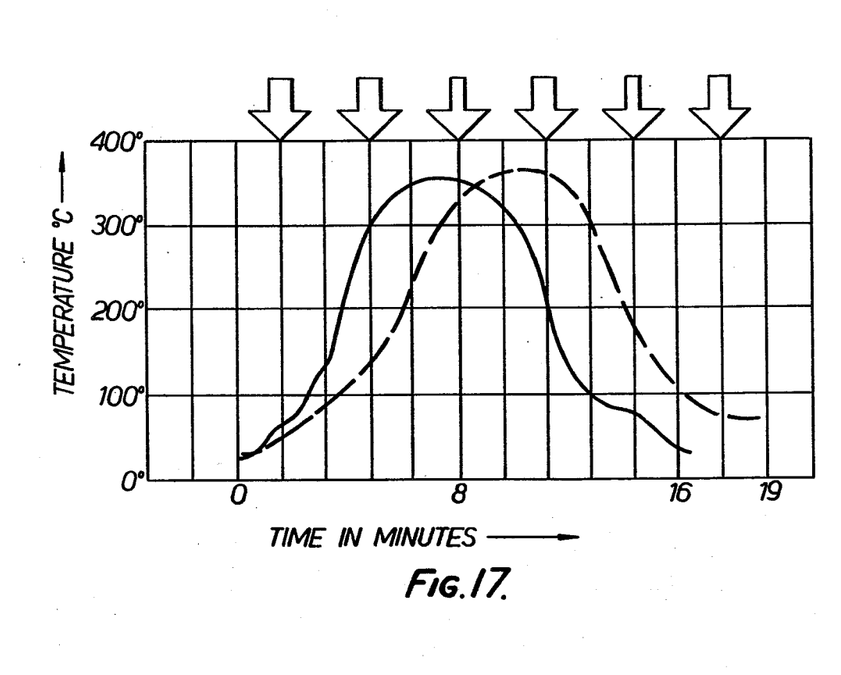
FIG. 17 shows curves of the temperature cycles that the objects exhibit in the apparatus as per FIG. 16.

FIG. 17 shows comparative curves for the temperature cycle that the containers undergo during sterilization. The abscissa represents the residence time within each zone, which is a function of the rate of travel of the conveyor. The ordinate represents the temperature of containers when subjected to airstreams at 350° C. The heat available for transfer along the axis of container transport is a function of both the differential in temperature of the air and containers, and the air volume striking the containers, that is, the air velocity. This explains the reduction in both the heating-up and cooling-down time as shown in the figure, yielding faster container throughputs, when multiple velocities are graded both the precise thermal energy transfer as well as for improved control over potential airborne contaminants. The broken line represents the temperature cycle the same containers undergo with single velocity air streams at identical air temperature.

Figure 18:
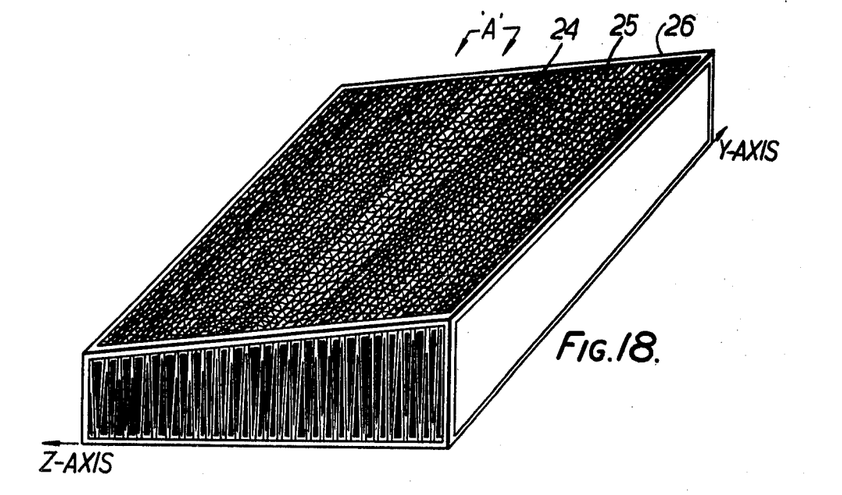
FIG. 18 is a perspective view of another form of filtering device having instrumentally for generating air streams of graded velocities along both the 'Y' and 'Z' axes, with one side partly sectioned.
Figure 19:
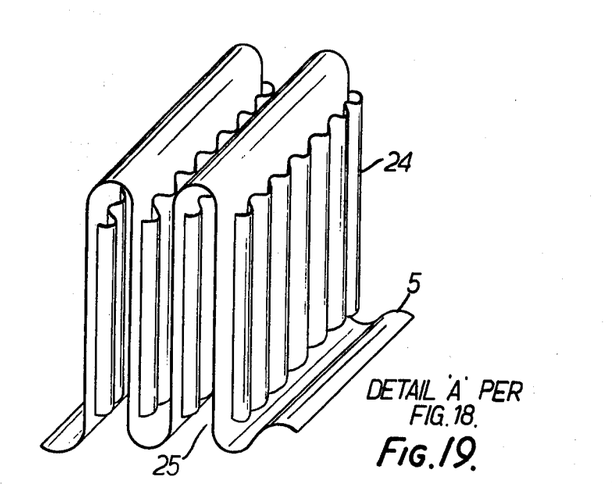
FIG. 19 is a detail of the device as per FIG. 18.
Figure 20:
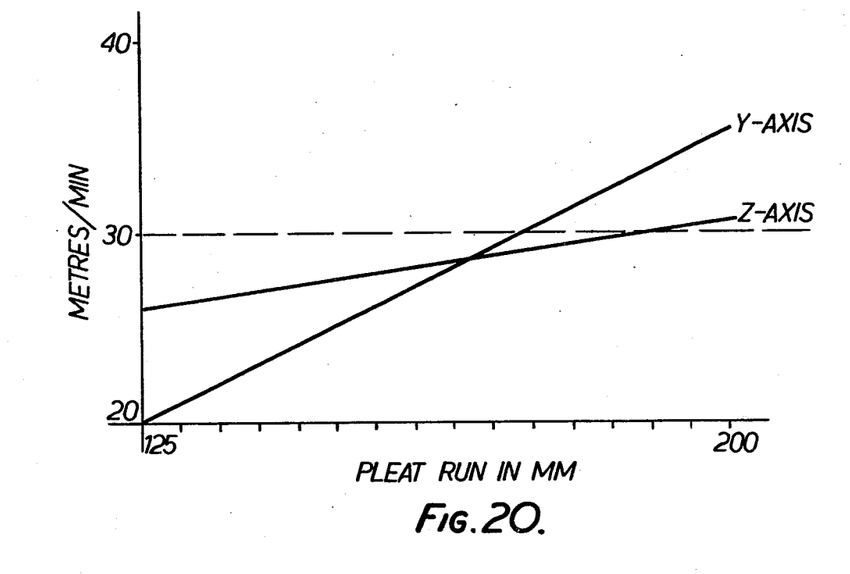
FIG. 20 graphically shows the velocity curves of the filtering device per FIG. 18.

FIG. 18 shows as embodiment of filtering device which, as detailed by FIG. 19, comprises a continuous filter medium 5, pleated around separators 24, each pleat of which is supported by a wider separator with a progressive increment ranging up to 10 mm, such that they support and separate the pleats 25 formed around them and channel the air. The assembly is housed in a frame 26 and sealed to prevent bypass around the medium. The increase in surface area of successive pleats correspondingly increases the air quantity that passes through each pleat as the pressure differential and traverse air velocity across the medium 5 are constant. This air is channelled by the separators to the projected filter face, where this variable volume yields graded velocities in overlapping steps and these velocities increase with each pleat. This is graphically represented by FIG. 20, where the exit air velocities plotted against the pleat run, are given for both the 'Y' and 'Z' axes, with the broken line representing uniform velocity flow at 30 meters per minute.

Although illustrative embodiments of the present invention have been described herewith with reference to drawings, it is to be understood that the invention is not limited to those particular embodiments and that various changes and modifications may be effected therein by one skilled in the art without departing from the scope of this invention. In particular, the pleated filter grading means can be replaced by another form of grading means which may or may not be a filter. It could be, for example, a filter member having a thickness which increases progressively from one edge of the membrane to an opposite edge, the membrane being arranged across the gas flow upstream of the work station. Alternatively, a foraminated grille could be employed as the grading means, with the open area of the foramination array increasing progressively from one edge of the grille to an opposite edge.

What is claimed is:

1. A method of maintaining the concentration of gas-borne particles in a work space defined by mutually perpendicular X, Y and Z axes to a level of less than 3 particles of 0.5 micron or larger per liter of gas, the plane formed by the X-Y axes being horizontal and impervious and the plane formed by the Y-Z axes being vertical, said method including the steps of (a) positioning a filter element having a plurality of straight, parallel pleats which have sequentially decreasing depths in the plane formed by the Y-Z axes such that the pleats extend parallel to the Y axis and the depths of the pleats are parallel to the X axis and decrease from pleat to pleat in the direction of the positive Z axis, (b) causing gas to pass through said filter element so as to provide a plurality of parallel, laminar streamlines of gas to flow in the direction of the positive X axis and parallel to the plane formed by the X-Y axes, the velocities of the streamlines incrementally decreasing from one streamline to the next in the direction of the positive Z axis.

2. The method as defined in claim 1 wherein the velocity (U) of the parallel gas streamlines ranges from a low of 15 m/minute to a high of 75 m/minute.

3. The method as defined in claim 1 including before step (a) the step of preheating the gas.

4. The method as defined in claim 15 wherein the gas is preheated to 250° C.

5. An apparatus defining a work space in which the concentration of gas-borne particles is maintained at a level of less than 3 particles of 0.5 micron or larger per liter of gas, the apparatus including (a) means forming a horizontal, impervious work surface defined by mutually perpendicular X and Y axes, (b) a filter member positioned vertically with respect to said horizontal, impervious work surface and defined by mutually perpendicular Y and Z axes, said filter element having a plurality of straight, parallel pleats which have sequentially decreasing depths, the filter element being oriented such that the pleats extend parallel to the Y axis and the depths of the pleats are parallel to the X axis and decrease from pleat to pleat in the direction of the positive Z axis, and (c) means to pass gas through said filter element so as to provide a plurality of parallel, laminar streamlines of gas flowing in the direction of the positive X axis and in parallel to the plane formed by the X-Y axis, the velocities of the streamlines incrementally decreasing from one streamline to the next in the direction of the positive Z axis.

* * * * *